US011224198B2

(12) United States Patent
Bégin et al.

(10) Patent No.: US 11,224,198 B2
(45) Date of Patent: Jan. 18, 2022

(54) ANIMAL HOUSE CLIMATE CONTROL SYSTEM AND METHOD FOR OPERATING AN AIR INLET OF THE ANIMAL HOUSE USING TIMED INLET CONTROL

(71) Applicant: The GSI Group, LLC, Assumption, IL (US)

(72) Inventors: Nicolas Bégin, Saint-Jean sur Richelieu (CA); Benoit R. Laberge, St-Hubert (CA); Yvon Gaudreau, St-Hubert (CA); Khaled Saad, La Prairie (CA)

(73) Assignee: The GSI Group, LLC, Assumption, IL (US)

( * ) Notice: Subject to any disclaimer, the term of this patent is extended or adjusted under 35 U.S.C. 154(b) by 1049 days.

(21) Appl. No.: 15/580,245

(22) PCT Filed: Jun. 3, 2016

(86) PCT No.: PCT/US2016/035661
§ 371 (c)(1),
(2) Date: Dec. 6, 2017

(87) PCT Pub. No.: WO2016/196888
PCT Pub. Date: Dec. 8, 2016

(65) Prior Publication Data
US 2018/0160646 A1      Jun. 14, 2018

Related U.S. Application Data

(60) Provisional application No. 62/170,375, filed on Jun. 3, 2015.

(51) Int. Cl.
*A01K 1/00* (2006.01)
*F24F 11/70* (2018.01)
(Continued)

(52) U.S. Cl.
CPC .......... *A01K 1/0047* (2013.01); *A01K 1/0058* (2013.01); *A01K 1/0064* (2013.01);
(Continued)

(58) Field of Classification Search
CPC .. A01K 1/0047; A01K 1/0058; A01K 1/0064; F24F 11/61; F24F 11/70; F24F 13/1426; F24F 2013/1433; F24F 2140/40
(Continued)

(56) References Cited

U.S. PATENT DOCUMENTS 3,752,208 A * 8/1973 Roberts ................. E05F 15/665
                                                            160/1
3,951,336 A     4/1976 Miller et al.
(Continued)

FOREIGN PATENT DOCUMENTS

GB          2238885 A1      6/1991

OTHER PUBLICATIONS

UK Intellectual Property Office, International Search Report for related UK Patent Application No. GB1510766.7, dated Nov. 25, 2015.
(Continued)

*Primary Examiner* — Brady W Frazier

(57) ABSTRACT

An animal house climate control system uses a method for operating a baffle of an air inlet of an animal house with a motor using timed inlet control. The method includes performing a calibration sequence to calculate opening velocity and opening inertia values and closing velocity and closing inertia values. The method also includes moving the baffle from an initial position to a final position by calculating a calculated power on time for the motor using the opening inertia or closing inertia values. The method can also include calculating a real position error value by comparing the calculated on time for the motor and a measured on time for
(Continued)

the motor and using the real position error value to calculate adjusted opening and closing velocity values.

10 Claims, 4 Drawing Sheets

(51) Int. Cl.
    *F24F 13/14*     (2006.01)
    *F24F 140/40*     (2018.01)
    *F24F 11/61*     (2018.01)

(52) U.S. Cl.
    CPC .......... *F24F 11/70* (2018.01); *F24F 13/1426* (2013.01); *F24F 11/61* (2018.01); *F24F 2013/1433* (2013.01); *F24F 2140/40* (2018.01)

(58) Field of Classification Search
    USPC ........................................................ 119/448
    See application file for complete search history.

(56) References Cited

U.S. PATENT DOCUMENTS

| | | | |
|---|---|---|---|
| 4,241,871 A | 12/1980 | Newell et al. | |
| 5,492,082 A * | 2/1996 | Krevinghaus | A01K 1/0047 119/437 |
| 2002/0109473 A1 * | 8/2002 | Romanowich | B60H 1/00835 318/434 |
| 2004/0038642 A1 * | 2/2004 | Gatley | F24F 11/74 454/239 |
| 2008/0009236 A1 * | 1/2008 | Dreher | A62C 35/68 454/256 |
| 2010/0206236 A1 * | 8/2010 | Pow | A01J 7/00 119/14.02 |
| 2012/0290136 A1 | 11/2012 | Romanowich et al. | |
| 2014/0096719 A1 * | 4/2014 | Klocke | A01K 1/0052 119/448 |
| 2015/0066222 A1 * | 3/2015 | Martinez | F24F 3/0442 700/277 |
| 2016/0120144 A1 * | 5/2016 | Kim | A01K 31/20 119/437 |

OTHER PUBLICATIONS

European Patent Office, International Search Report for parent International Application No. PCT/US2016/035661, dated Sep. 19, 2016.

\* cited by examiner

Key:

TTo = Travel time open
TTc = Travel time close
io = Inertia open
ic = Inertia close
ta = total movement time for inertia measurement
tb = small movement for inertia measurement
tc = remaining close time after known movement sequence
to = remaining open time after known movement sequence
LS_Closed = Limit switch closed
LS_Open = Limit switch open

ANIMAL HOUSE CLIMATE CONTROL SYSTEM AND METHOD FOR OPERATING AN AIR INLET OF THE ANIMAL HOUSE USING TIMED INLET CONTROL

CROSS REFERENCE TO RELATED APPLICATION

This application claims the benefit of U.S. Provisional Application No. 62/170,375 filed Jun. 3, 2015, which is hereby incorporated by reference in its entirety.

BACKGROUND OF THE INVENTION

Field of Invention

This invention relates to climate control systems for buildings used to house animals, and more particularly to a method for operating an air inlet of the animal house using timed inlet control.

Description of Related Art

In buildings that are used to house animals such as poultry, swine or livestock, it is important to maintain a desired building climate. A well-controlled environment involves monitoring and regulating the temperature, relative humidity and air quality in the building. For example, properly controlled temperatures enable animals to use feed for growth rather than for body heat. A properly heated animal house results in lower feed costs and increased animal productivity. Additionally, control over the level of humidity in the building is necessary because excess humidity contributes to animal discomfort and promotes the growth of harmful air born bacteria that can cause respiration diseases. Having an elevated humidity level in the animal house may also lead to more frequent changes of bedding and litter which increases production costs.

To maintain the proper climate in the animal building, various heaters and ventilation fans are used as necessary to maintain the desired temperature and humidity. It is known to use a control unit to automatically control operation of the heaters and ventilation fans located within the building. Sensing devices, such as temperature sensing devices, are used to provide the necessary information to the control unit to enable such automatic control. Improper operation of any of the heaters or ventilation fans can lead to undesirable and even dangerous conditions in the animal building. Air Inlets are used to bring air into the animal house.

Typically, an air inlet has a baffle or a curtain used to vary the amount of air coming into the animal building. The baffle or curtain is mechanically driven by linear actuator or curtain machine, which is controlled by the control system. The position of the baffle or curtain determines the air flow and air speed for a fixed ventilation power. Air flow and mix are important variables responsible for temperature profile throughout the building and for air pattern in animal house ventilation that affect animal health and comfort. In winter, the air inlet system has to optimize mixing and minimize temperature differences in between the different zones of the room. In summer, the air inlet system must provide enough air to the fans to maintain high air volume while insuring high air speed at floor level. In situations where ventilation is minimal, accurate positioning of the air inlet is vital to providing the desired air flow as small position errors can lead to large air flow and mix variations. Some linear actuators feature a position sensor used to detect the actually position of the linear actuator. However, such sensors are typically high maintenance items and unreliable and failures are common and difficult to repair.

One attempt to overcome the problem experienced by air inlet position controls is to use timed base operation and calculate how long an actuator needs to be energized for a desired change in air inlet surface. However, such systems have operated without feedback and as actuators are turned on and off, a position error accumulates. These systems can be activated many times each hour, so after many hours the actual position can be widely different than the calculated opening. To reset this error, air inlet position controls completely close (or open) air inlets a few times a day. Such resetting operations require ventilation to be stopped or disrupted for a few minutes a few times a day. The overall effect is not desirable for both animals and ventilation equipment.

It is desired to have a more reliable air inlet system that better controls airflow through air inlets.

OVERVIEW OF THE INVENTION

In one embodiment, the invention is directed to a climate control system for an animal house. The climate control system includes a plurality of climate control input devices configured to measure a climate input selected from the group of temperature and static pressure, wherein the plurality of input devices are located in different portions of the animal house and a plurality of climate control ventilation fans. The climate control system includes at least one air inlet used to control airflow into the animal house, the at least one air inlet having a baffle configured to change the area of the opening of the air inlet to vary the amount of air coming into the animal building. At least one actuator is operably connected to the baffle of the at least one air inlet having a motor, such that the at least one actuator is used to selectively control the position of the baffle. The climate control system has an open limit switch that is triggered when the baffle reaches a fully open position and a closed limit switch that is triggered when the baffle reaches a fully closed position. The climate control system has a sensor configured to read the current applied to the motor. A control unit configured to receive input information from the plurality of climate control input devices and regulate the operation of the ventilating fans, wherein the control unit controls operation of the actuator using a calibrated timed position opening and closing commands to adjust the position of the baffle of the at least one air inlet. The control unit accounts for dragging delays and overshoot inertias at calibration and considers these dragging delays or inertias into the calibrated timed position opening and closing commands. The control unit uses a calibration step that reads actuator motor current to determine when the actuator hits one of the opening and closing limit switches, and an air inlet calibration sequence to determine an open travel time, a close travel time, an open inertia, a close inertia, an open velocity and a close velocity.

In another embodiment, the invention is directed to a method for operating a baffle of an air inlet of an animal house with a motor using timed inlet control. The method includes performing a calibration sequence to calculate opening velocity and opening inertia values and closing velocity and closing inertia values. The method also includes moving the baffle from an initial position to a final position by calculating a calculated power on time for the motor using the opening inertia or closing inertia values. The method can also include calculating a real position error value by comparing the calculated on time for the motor and a measured on time for the motor and using the real position error value to calculate adjusted opening and closing velocity values.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DETAILED DESCRIPTION OF EXEMPLARY EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Figure 1:
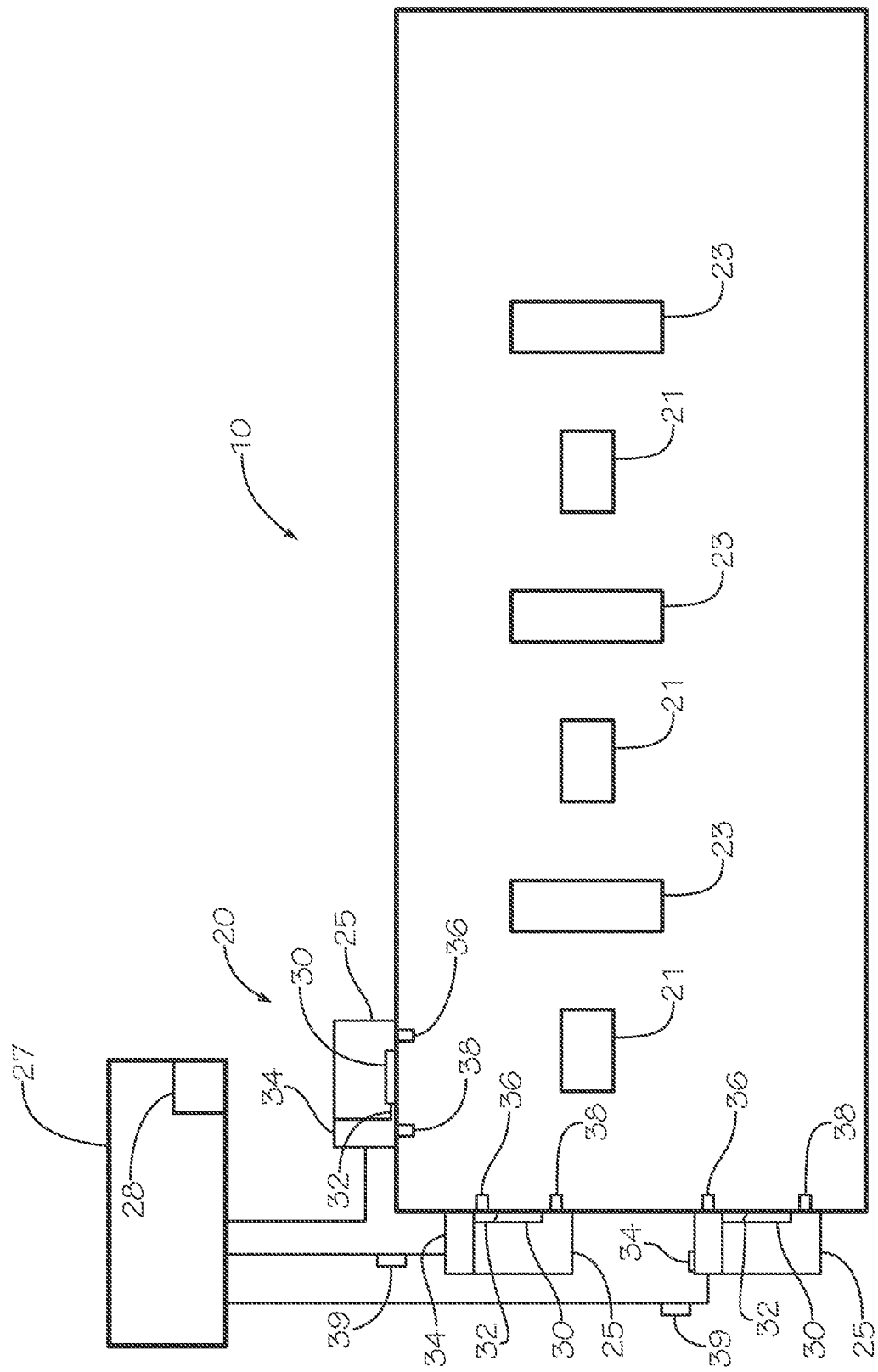
FIG. 1 is a schematic drawing of a climate control system of an animal house.

Referring to FIG. 1, a schematic of an animal house 10 having a climate control system 20 is shown. The climate control system 20 has a plurality of climate control sensing or input devices, such as temperature or static pressure probes, indicated at 21. The sensing devices 21 may be located in different portions of the animal house 10 so that climate information, such as temperature and static pressure, may be received for the different portions. Although three input devices 21 are shown, it will be understood that this is for purposes of illustrations only, and that additional or fewer input devices may be provided, as required. The climate control system 20 also has a plurality of climate control output devices, such as ventilation fans and/or heaters, indicated at 23 mounted in the building 10. Although three heaters and ventilating fans 23 are shown, it will be understood that this is for purposes of illustrations only, and that additional or fewer heaters and fans may be provided, as required. Various air inlets such as sidewall inlets, ceiling inlets and or tunnel inlets, indicated at 25, are used by the climate control system 20 to control airflow into the animal house 10. Although three air inlets 25 are shown, it will be understood that this is for purposes of illustrations only, and that additional or fewer air inlets may be provided, as required.

The climate control system 20 has a main control unit 27, which incorporates a suitable controller, such as a microprocessor main control unit 28, which receives input information from the input devices 21 and regulates the operation of the ventilating fans and heaters 23 and the air inlets 25.

Each air inlet 25 has a baffle or a curtain 30 used to change the area of the opening of the air inlet 25 and vary the amount of air coming into the animal building 10. The position of the baffle 30 determines the air flow and air speed for a fixed ventilation power of the ventilating fans 23. The baffle 30 is positioned by an actuator 32 driven by a motor 34 controlled by the control unit 27. In one embodiment, the baffle 30 is moved by a linear actuator 32 driven by electric motor 34. As would be understood by one skilled in the art, rotary motion of the motor 34 is converted to linear displacement of the actuator 32 and thus movement of the baffle 30. The air inlet 25 also has an open limit switch 36 that is triggered when the baffle 30 reaches the fully open position ($LS_{Open}$) and a closed limit switch 38 that is triggered when the baffle reaches the fully closed position ($LS_{Closed}$).

In one embodiment, reading the current of the motor 34 lets the control unit 27 know every time a limit switch 36, 38 is hit, a situation that happens during normal operation. In one embodiment, each time one of the limit switches 36, 38 is hit, motor 34 current drops to zero. Desirably, the control unit 27 causes an automatic error position reset with each such occurrence. In operation, the actuator 32 is moved many times every hour to reposition the baffle 30 based on the inputs from the input devices 21. Depending on weather and animal conditions, the baffle 30 may be operated close to its fully extended or fully retracted position. Doing so, the baffle 30 hits limit switches 36, 38 and stops by itself even though the control unit 27 can continue to apply power. By reading motor current through a sensor in line with the commanding relays, the control unit 27 can determine when the actuator 32 hits a switch 36, 38, i.e., when the current drops to zero. Each time an actuator 32 hits a limit switch 36, 38 an automatic error position reset happens. Thus, mandatory called for position reset can be reduced to minimum, every 12 hours or so for which the actuator 32 has not hit a limit switch 36, 38. Moreover, a reset normally requires the control unit 27 to close (or open) the actuator 32 for a period of time equal to a full stroke (typically 60-120 seconds) even though it may reach position after only a few seconds. By reading motor current, reset time can be reduced to minimum and normal operation can resume as soon as motor current drops to zero.

Additionally, reading the current of the motor 34 lets the control unit 27 detect a malfunction of the air inlet 25 which may lead to animal discomfort or death. As an example, an actuator 32 that won't move in any direction (motor current stays at zero or is out of range) is defective and should backed-up by another air inlet 25 such as by opening wider another air inlet 25 or by using a separate air inlet 25.

The climate control system 20 uses a calibrated timed position method to adjust the position of the baffle 30 of the air inlet 25. An advantage of using timed position control is the method does not require problematic position sensing devices to sense the position of the baffle 30; the control unit 27 just needs to be calibrated to mathematically relate cumulative Open Time with opening. One problem with climate control systems 20 is that they drag at start and at stop leading to significant drift into opening calculations/estimates after 10-20 open and close cycles. According to one embodiment of the invention, the climate control system 20 accounts for drag and overshoot at calibration and considers these dragging delays or inertias into the opening and closing calculations. The time before stopping to move is measured as the amount of time the baffle 30 is still moving after the control unit 27 has given the command to stop. Inertia of the baffle 30 varies with load on the actuator 32. Thus, inertias are calculated for open and close operation at different position of the baffle 30 as the load on the actuator 32 may vary.

Figure 2:
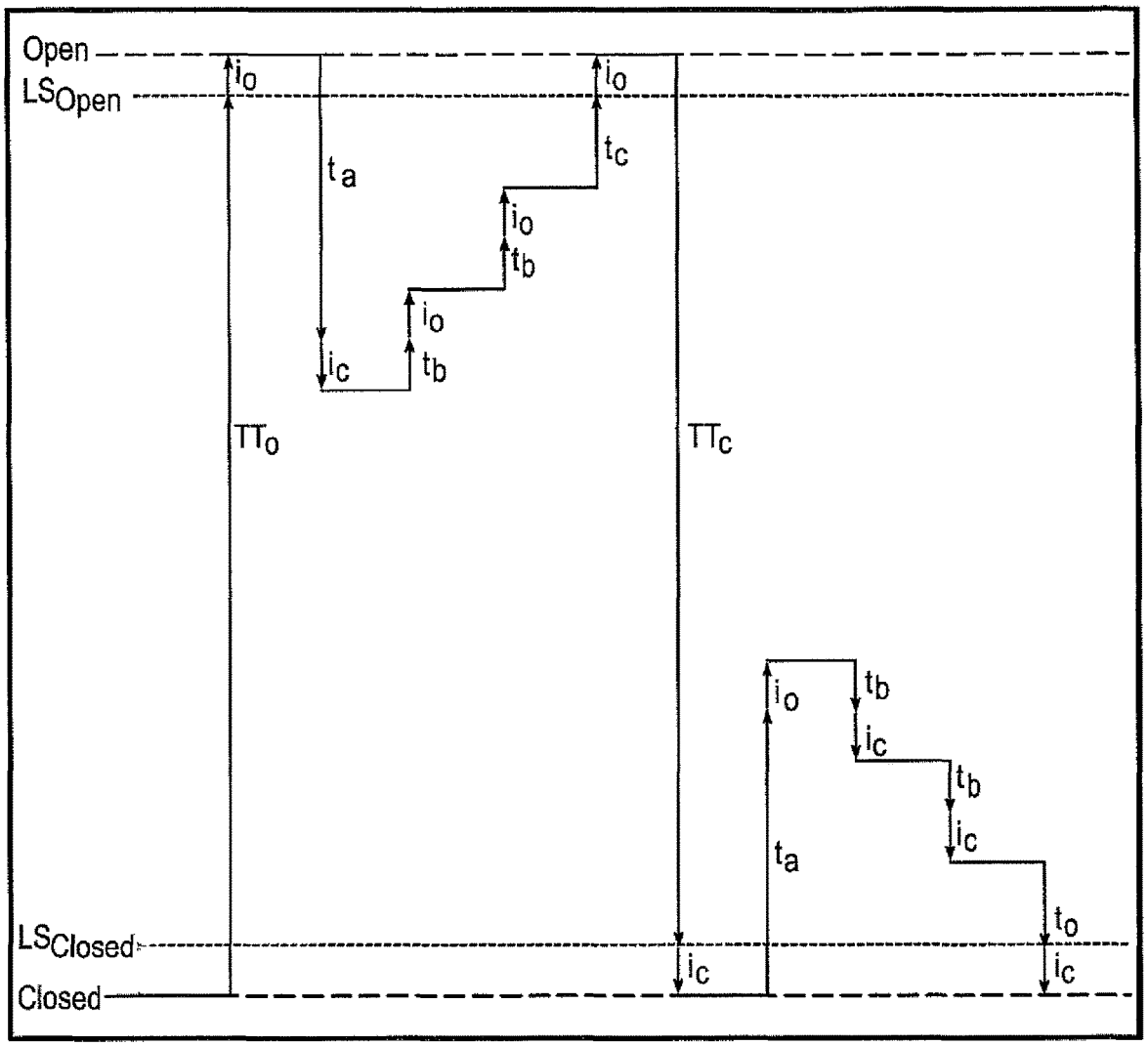
FIG. 2 is a calibration sequence for the climate control system.

FIG. 2 illustrates a method for calibrating the climate control system 20. First, an automatic calibration step reads actuator motor 34 current to determine when the actuator 32 hits it's a limit switch 36, 38. Second, an air inlet calibration sequence is used to determine the open travel time, the close travel time, the open inertia, the close inertia, the open velocity and the close velocity. In the example calibration sequence for time based inlets:

$TT_o$=Travel time open
$TT_c$=Travel time close
$i_o$=Inertia open
$i_c$=Inertia close
$t_a$=total movement time for inertia measurement
$t_b$=small movement for inertia measurement
$t_c$=remaining close time after known movement sequence
$t_o$=remaining open time after known movement sequence
n=number of small movements for inertia measurement
$v_o$=open velocity in %/sec.
$v_c$=close velocity in %/sec. (close velocity is negative)

Using the measurements from the calibration sequence, inertia open ($i_o$) and inertia close ($i_c$) values are calculated. In one embodiment, the inertia open ($i_o$) value is calculated using the following equation:

$$i_o = \frac{-(n^2+2n)t_b - (n+1)t_c + (n+2)t_a - t_o}{n^2+2n}$$

In one embodiment, the inertia close (ic) value is calculated using the following equation:

$$t_c = nt_b + (m+1)t_o + t_c - t_a$$

$$v_o = \frac{100}{TT_o}$$

$$v_c = -\frac{100}{TT_c}$$

Set $t_a$, $t_b$ and n
Measure $t_c$, $t_o$, $TT_o$, $TT_c$ while executing sequence.
With:
ta=10 sec
tb=2 sec
n=2
The inertia open ($i_o$) value is calculated:

$$i_o = \frac{24 - 3t_c - t_o}{8}$$

The inertia close (ic) value is calculated:

$$t_c = t_c + 3t_a - 6$$

Desirably, inertia is measured in hundredth of a second for time-based inlets.

Time Based Inlet Movement

Figure 3:
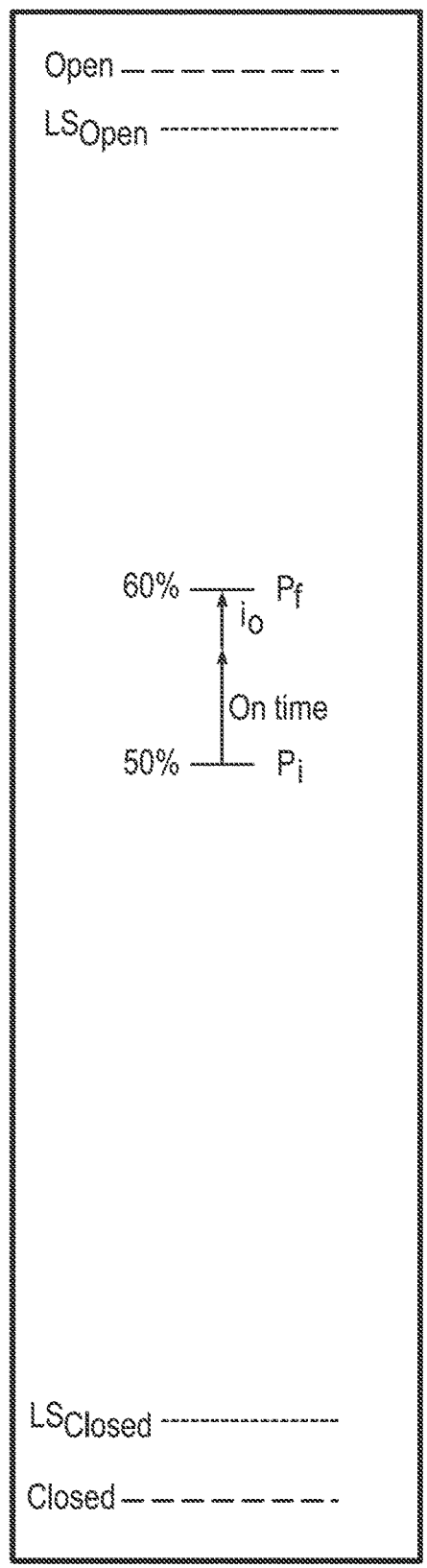
FIG. 3 is a baffle opening sequence for the climate control system.

Turning now to FIG. 3, to move a baffle 30 from an estimated or known position to another, the on time for the actuator 32 can be calculated as follows:
Key:
Pi=Initial position
Pf=Final position
On time=Power on time needed for suited movement $$\text{Open on time} = \frac{P_f - P_i}{v_o} - i_o$$

$$\text{Close on time} = \frac{P_f - P_i}{v_c} - i_c$$

Accumulated Error and Reset

Figure 4:
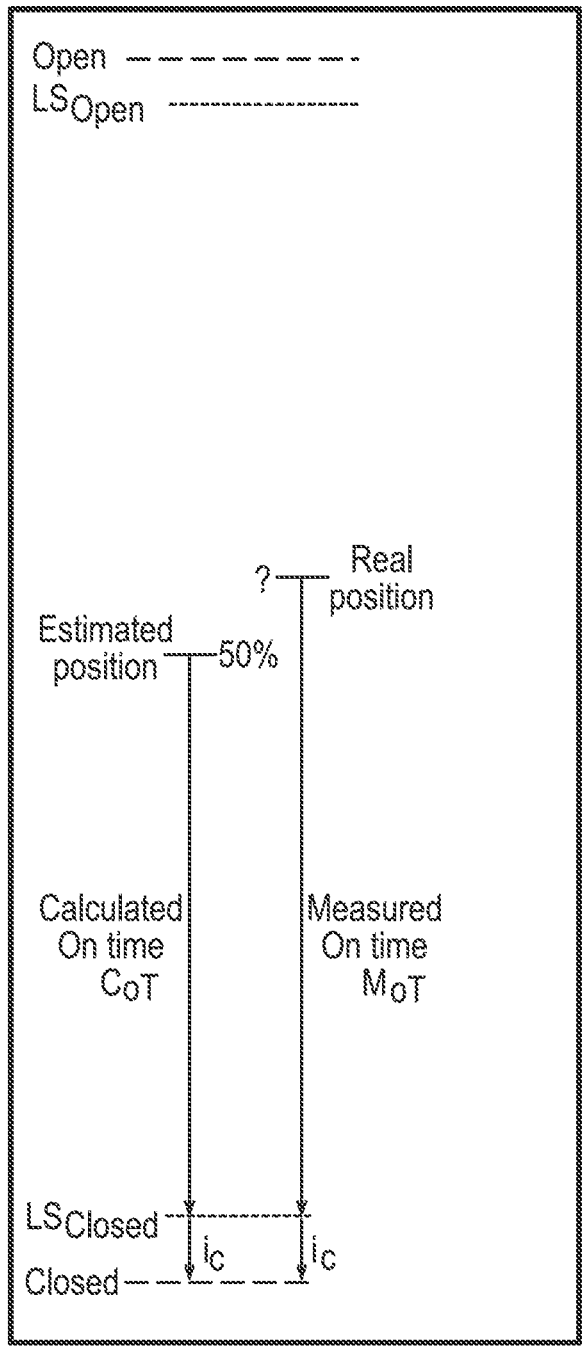
FIG. 4 is an error correction sequence for the climate control system.

Turning now to FIG. 4, it is desired to calculate an accumulated error and reset. This section presents velocity correction theory and an application example. Relations presented here holds for a reset to closed position.

Let actuator A be at an estimated position of 50%, $TT_o$=120 sec, $v_c$=0.869%/sec, $v_o$=0.830%/sec.
Last actuator movements were:
$n_o$=32 movements in open direction
$n_c$=18 movements in close direction $$C_{OT} = \frac{P_f - P_i}{v_c} - i_c = \frac{0\text{-}50\%}{-0.869} - 0.5 = 57.03 \text{ sec.}$$

$$M_{OT} = 58.10 \text{ sec}$$

$$\text{Error} = M_{OT} - C_{OT} = 1.07 \text{ sec}$$

If |Error|≥1% and known last movements distribution, take the appropriate path shown in Table 1

TABLE 1

| Reset type | Error | $n_o$:$n_c$ | Open time | Close time | Relation |
|---|---|---|---|---|---|
| Closed | Positive | $n_o > n_c$ | Decrease | = | 1 |
| Closed | Positive | $n_o < n_c$ | Decrease | Increase | 2 |
| Closed | Negative | $n_o > n_c$ | Increase | Decrease | 3 |
| Closed | Negative | $n_o < n_c$ | = | Decrease | 4 |
| Open | Positive | $n_o > n_c$ | Increase | Decrease | 3 |
| Open | Positive | $n_o < n_c$ | = | Decrease | 4 |
| Open | Negative | $n_o > n_c$ | Decrease | = | 1 |
| Open | Negative | $n_o < n_c$ | Decrease | Increase | 2 |

$$TT'_o = TT_o - \frac{n_c}{n_o + n_c} \cdot \text{Error} = 120 - \frac{18}{18 + 32} \cdot 1.07 = 119.61 \quad 1$$

$$v'_o = \frac{100}{TT'_o} = \frac{100}{119.61} = 0.836$$

$$TT'_o = TT_o - \frac{n_o}{n_o + n_c} \cdot \text{Error} \quad 2$$

$$TT'_c = TT_c + \frac{n_c}{n_o + n_c} \cdot \text{Error}$$

$$v'_o = \frac{100}{TT'_o}$$

$$v'_c = \frac{100}{TT'_c}$$

$$TT'_o = TT_o + \frac{n_o}{n_o + n_c} \cdot \text{Error} \quad 3$$

-continued $$TT'_c = TT_c - \frac{n_c}{n_o + n_c} \cdot \text{Error}$$

$$v'_o = \frac{100}{TT'_o}$$

$$v'_c = \frac{100}{TT'_c}$$

$$TT'_c = TT_c - \frac{n_o}{n_o + n_c} \cdot \text{Error} \qquad 4$$

$$v'_c = \frac{100}{TT'_c}$$

Wherein increasing velocity shortens calculated movement times and decreasing velocity lengthens calculated movement times.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings.

The invention claimed is:

1. A climate control system for an animal house, the climate control system comprising:
    a plurality of climate control input devices configured to measure a climate input selected from the group of temperature and static pressure, wherein the plurality of input devices are configured to be located in different portions of the animal house;
    a plurality of climate control ventilation fans;
    at least one air inlet used to control airflow into the animal house, each of the at least one air inlets having a baffle configured to change the area of the opening of the air inlet to vary the amount of air coming into the animal building;
    at least one actuator operably connected to the baffle of the respective at least one air inlet having a motor, the at least one actuator used to selectively control the position of the baffle;
    an open limit switch that is triggered when the baffle reaches a fully open position;
    a closed limit switch that is triggered when the baffle reaches a fully closed position;
    a sensor configured to read the current applied to the motor; and
    a control unit configured to receive input information from the plurality of climate control input devices and regulate the operation of the ventilating fans, wherein the control unit controls operation of each actuator to move each respective baffle of the at least one air inlet from an initial position to a final position using calibrated timed position opening and closing commands, wherein the calibrated timed position opening and closing commands account for overshoot inertia delays of the baffle of the respective air inlet.

2. The climate control system of claim 1 wherein overshoot inertia delays are measured as the amount of time each respective baffle continues to move after the control unit has given a command to stop.

3. The climate control system of claim 1 wherein the control unit uses a calibration step that reads actuator motor current to determine when the actuator hits one of the opening and closing limit switches, and an air inlet calibration sequence to determine an open travel time value, a close travel time value, an open inertia value, a close inertia value, an open velocity value and a close velocity value.

4. A method for operating a baffle of an air inlet of an animal house with a motor using timed inlet control, the method comprising:
    performing a calibration sequence to calculate opening velocity and opening inertia values and closing velocity and closing inertia values;
    calculating a calculated power on time for the motor required to move the baffle from an initial position to a final position using the opening inertia or closing inertia values to account for overshoot inertia delays of the baffle; and
    moving the baffle from the initial position to the final position with the motor using the calculated power on time.

5. The method of claim 4 further comprising calculating a real position error value by comparing the calculated power on time for the motor and a measured on time for the motor and using the real position error value to calculate adjusted opening and closing velocity values.

6. The method of claim 4 wherein performing the calibration sequence to calculate the opening velocity comprises measuring the travel time to go from a fully closed position to a fully open position and calculating the closing velocity comprises measuring the travel time to go from the fully open position to the fully closed position.

7. The method of claim 4 wherein the opening inertia value and the closing inertia value are representative of an amount of time the baffle continues to move after a control unit has given a command to stop movement of the baffle when positioning the baffle.

8. The method of claim 4 wherein moving the baffle from the initial position to the final position comprises moving the baffle from an initial position somewhere between the fully open position and the fully closed position to a final position somewhere between the fully open position and the fully closed position by calculating a calculated power on time for the motor using the opening velocity and opening inertia values or using the closing velocity and closing inertia values, wherein:
    when the initial position is closer to the fully open position and the final position is closer to the fully closed position, calculating the power on time for the motor using the closing velocity and closing inertia values, and
    when the initial position is closer to the fully closed position and the final position is closer to the fully open position, calculating the power on time for the motor using the opening velocity and opening inertia values.

9. The method of claim 8 further comprising calculating a real position error value by comparing the calculated power on time for the motor and a measured power on time for the motor and using the real position error value to calculate adjusted opening and closing velocity values.

10. The method of claim 9 wherein the opening inertia value is calculated by performing a movement sequence wherein the baffle is moved from the fully closed position toward the fully open position a first known small movement to a first intermediate position and measuring a travel time for the first known small movement, and then moving the baffle from the first intermediate position to the fully closed position, and wherein the closing inertia value is calculated by performing a movement sequence wherein the baffle is moved from the fully open position toward the fully closed position a second known small movement to a second intermediate position and measuring a travel time for the second small known movement, and then moving the baffle from the second intermediate position to the fully closed position.

* * * * *